US008966625B1

(12) United States Patent  
Zuk et al.

(10) Patent No.: US 8,966,625 B1  
(45) Date of Patent: Feb. 24, 2015

(54) IDENTIFICATION OF MALWARE SITES USING UNKNOWN URL SITES AND NEWLY REGISTERED DNS ADDRESSES

(75) Inventors: Nir Zuk, Menlo Park, CA (US); Renzo Lazzarato, Pleasanton, CA (US); Huagang Xie, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 247 days.

(21) Appl. No.: 13/115,014

(22) Filed: May 24, 2011

(51) Int. Cl.  
 *G06F 11/00* (2006.01)
(52) U.S. Cl.  
 USPC ............... 726/22; 726/23; 726/24; 726/25; 726/11; 713/2; 709/227
(58) Field of Classification Search  
 CPC .... H04L 63/0236; H04L 9/3297; G06F 11/00  
 USPC .............. 726/22–25, 12, 3–4; 713/2; 709/220  
 See application file for complete search history.

(56) References Cited

U.S. PATENT DOCUMENTS

| | | | |
|---|---|---|---|
| 7,649,838 B2 * | 1/2010 | Fishteyn et al. ............... 370/229 |
| 7,664,855 B1 | 2/2010 | Freed et al. |
| 7,870,610 B1 | 1/2011 | Mitchell et al. |
| 7,958,555 B1 * | 6/2011 | Chen et al. ................... 726/22 |
| 8,141,132 B2 * | 3/2012 | Oliver et al. .................. 726/3 |
| 8,260,914 B1 * | 9/2012 | Ranjan ......................... 709/224 |
| 8,291,468 B1 | 10/2012 | Chickering |
| 8,316,440 B1 * | 11/2012 | Hsieh et al. .................. 726/22 |
| 8,402,543 B1 | 3/2013 | Ranjan et al. |
| 8,407,324 B2 | 3/2013 | McDougal |
| 8,438,639 B2 | 5/2013 | Lee et al. |
| 8,484,739 B1 * | 7/2013 | Seshadri ....................... 726/25 |
| 8,516,591 B2 * | 8/2013 | Fly et al. ....................... 726/24 |
| 8,539,577 B1 * | 9/2013 | Stewart et al. ................ 726/22 |
| 8,572,740 B2 * | 10/2013 | Mashevsky et al. ........... 726/24 |

(Continued)

OTHER PUBLICATIONS

Russ White, High availability in Routing, Mar. 2004, Cisco Systems, vol. 3, pp. 1-28.*

(Continued)

*Primary Examiner* — Dede Zecher  
*Assistant Examiner* — Viral Lakhia  
(74) *Attorney, Agent, or Firm* — Van Pelt, Yi & James LLP

(57) ABSTRACT

In some embodiments, identification of malware sites using unknown URL sites and newly registered DNS addresses includes performing a heuristic analysis for information associated with a network site; and assigning a score based on the heuristic analysis, in which the score indicates whether the network site is potentially malicious. In some embodiments, the system includes a security appliance that is in communication with the Internet. In some embodiments, the network site is associated with a network domain and/or a network uniform resource locator (URL). In some embodiments, performing a heuristic analysis for information associated with a network site further includes determining if a network site has recently been registered. In some embodiments, performing a heuristic analysis for information associated with a network site further includes determining if a network site is associated with recently changed DNS information. In some embodiments, performing a heuristic analysis for information associated with a network site further includes determining geographical information as well as an IP network location associated with the network site.

24 Claims, 6 Drawing Sheets

(56) References Cited

U.S. PATENT DOCUMENTS

| | | | | |
|---|---|---|---|---|
| 8,578,481 | B2 * | 11/2013 | Rowley | 726/22 |
| 8,756,691 | B2 * | 6/2014 | Nachenberg | 726/24 |
| 2005/0177602 | A1 | 8/2005 | Kaler et al. | |
| 2007/0261112 | A1 * | 11/2007 | Todd et al. | 726/11 |
| 2008/0016552 | A1 * | 1/2008 | Hart | 726/3 |
| 2008/0177994 | A1 * | 7/2008 | Mayer | 713/2 |
| 2009/0055928 | A1 * | 2/2009 | Kang et al. | 726/22 |
| 2009/0144826 | A2 * | 6/2009 | Piccard | 726/24 |
| 2010/0115586 | A1 * | 5/2010 | Raghavan et al. | 726/3 |
| 2010/0162350 | A1 * | 6/2010 | Jeong et al. | 726/1 |
| 2011/0041179 | A1 * | 2/2011 | St Hlberg | 726/23 |
| 2011/0055923 | A1 * | 3/2011 | Thomas | 726/23 |
| 2011/0099620 | A1 | 4/2011 | Stavrou et al. | |
| 2011/0185425 | A1 | 7/2011 | Lee et al. | |
| 2011/0296486 | A1 * | 12/2011 | Burch et al. | 726/1 |
| 2012/0084860 | A1 | 4/2012 | Cao et al. | |
| 2012/0089700 | A1 | 4/2012 | Safruti et al. | |
| 2012/0096549 | A1 * | 4/2012 | Amini et al. | 726/23 |
| 2012/0117650 | A1 * | 5/2012 | Nachenberg | 726/24 |
| 2012/0233691 | A1 | 9/2012 | Jiang | |
| 2012/0278889 | A1 | 11/2012 | El-Moussa | |

OTHER PUBLICATIONS

Landecki, Grzegorz, Detecting Botnets, Linux Journal, Jan. 1, 2009.
Karasaridis, Anestis et al., Wide-scale Botnet Detection and Characterization, Dec. 14, 2010.
Author Unknown, Advanced Persistent Threats (APT), What's an APT? A Brief Definition, Damballa, Dec. 14, 2010.
Author Unknown, Executive Overview, The Command Structure of the Aurora Botnet, Damballa, 2010.
Strayer, W. Timothy et al. Detecting Botnets with Tight Command and Control, BBN Technologies, 2006.
Ramachandran, Anirudh et al., Revealing Botnet Membership Using DNSBL Counter-Intelligence, 2006.
Goebel, Jan et al., Rishi: Identify Bot Contaminated Hosts by IRC Nickname Evaluation, 2007.
Gu, Guofei et al., BotSniffer: Detecting Botnet Command and Control Channels in Network Traffic, 2008.
Gu, Guofei et al., BotHunter: Detecting Malware Infection Through IDS-Driven Dialog Correlation, 2007.
Gu, Guofei et al., BotMiner: Clustering Analysis of Network Traffic for Protocol- and Structure-Independent Botnet Detection, 2008.
Royal, Paul, Analysis of the Kraken Botnet, Damballa, Apr. 9, 2008.
Livadas, Carl et al., Using Machine Learning Techniques to Identify Botnet Traffic, BBN Technologies, 2006.
Binkley, James R. et al., An Algorithm for Anomaly-based Botnet Detection, 2006.
Yen, Ting-Fang et al., Traffic Aggregation for Malware Detection, 2008.
Author Unknown, Anatomy of a Targeted Attack, Damballa, Dec. 3, 2008.
Author Unknown, Layer 8, How and Why Targeted Attacks Exploit Your Users, Damballa, Nov. 2011.
Author Unknown, Targeted Attacks for Fun and Profit, An Executed Guide to a New and Growing Enterprise Threat, Damballa, Oct. 13, 2008.
Author Unknown, AV, IDS/IPS and Damballa's Response to Targeted Attacks, A Technology Comparison, Damballa, Nov. 2008.
Author Unknown, Updated on the Enemy, A Deconstruction of Who Profits From Botnets, Damballa, May 13, 2009.
Author Unknown, A Day in the Life of a BotArmy, Damballa, 2008.
Ollmann, Gunter, Botnet Communication Topologies, Understanding the Intricacies of Bonet Command and Control, Damballa, 2009.
Ollmann, Gunter, The Botnet vs. Malware Relationship, The One to one Botnet Myth, Damballa, 2009.
Author Unknown, Closed Window, How Failsafe Enhancements Dramatically Limit Opportunities for Malware Armies and other Targeted Attacks, Damballa, Sep. 23, 2009.
Author Unknown, Damballa's In-The-Cloud Security Model, Enterprise Protection Moves Beyond the Network Perimeter, Damballa, Aug. 24, 2008.
Ollmann, Gunter, Extracting CnC from Malware, The Role of malware Sample Analysis in Botnet Detection, Damballa, 2009.
Ollmann, Gunter, The Opt-IN Botnet Generation, Hacktivism and Centrally Controlled Protesting, Social Networks, Damballa, 2010.
Ollmann, Gunter, Serial Variant Evasion Tactics, Techniques Used to Automatically Bypass Antivirus Technologies, Damballa, 2009.
Author Unknown, Damballa: A Different Approach, Targeted Attacks Requires a New Solution, Damballa, Sep. 23, 2008.
Author Unknown, Trust Betrayed, What to Do When a Targeted Attack Turns Your Networks Against You, Damballa, 2008.
Author Unknown, How to Be a Hero in the War Against BotArmies, Damballa, 2008.
Giroire, Frederic et al., Exploiting Temporal Persistence to Detect Convert Botnet Channels, 2009.
Zang et al., Botnet Detection Through Fine Flow Classification, CSE Dept. Technical Report No. CSE11-001, p. 1-17, Jan. 31, 2011.

* cited by examiner

IDENTIFICATION OF MALWARE SITES USING UNKNOWN URL SITES AND NEWLY REGISTERED DNS ADDRESSES

BACKGROUND OF THE INVENTION

A botnet generally refers to a collection of software (e.g., software agents or robots) that run autonomously and automatically. Examples of botnets include IRC bots and malicious software, and can also include a network of computers using distributed computing software.

Various forms of malicious software detection exist. For example, antivirus software is often used to detect malicious software, which typically uses signature detection techniques in which signature updates are generally provided periodically to the antivirus software for newly generated signatures for newly identified malicious software.

BRIEF DESCRIPTION OF THE DRAWINGS

Various embodiments of the invention are disclosed in the following detailed description and the accompanying drawings.

DETAILED DESCRIPTION

Figure 1:
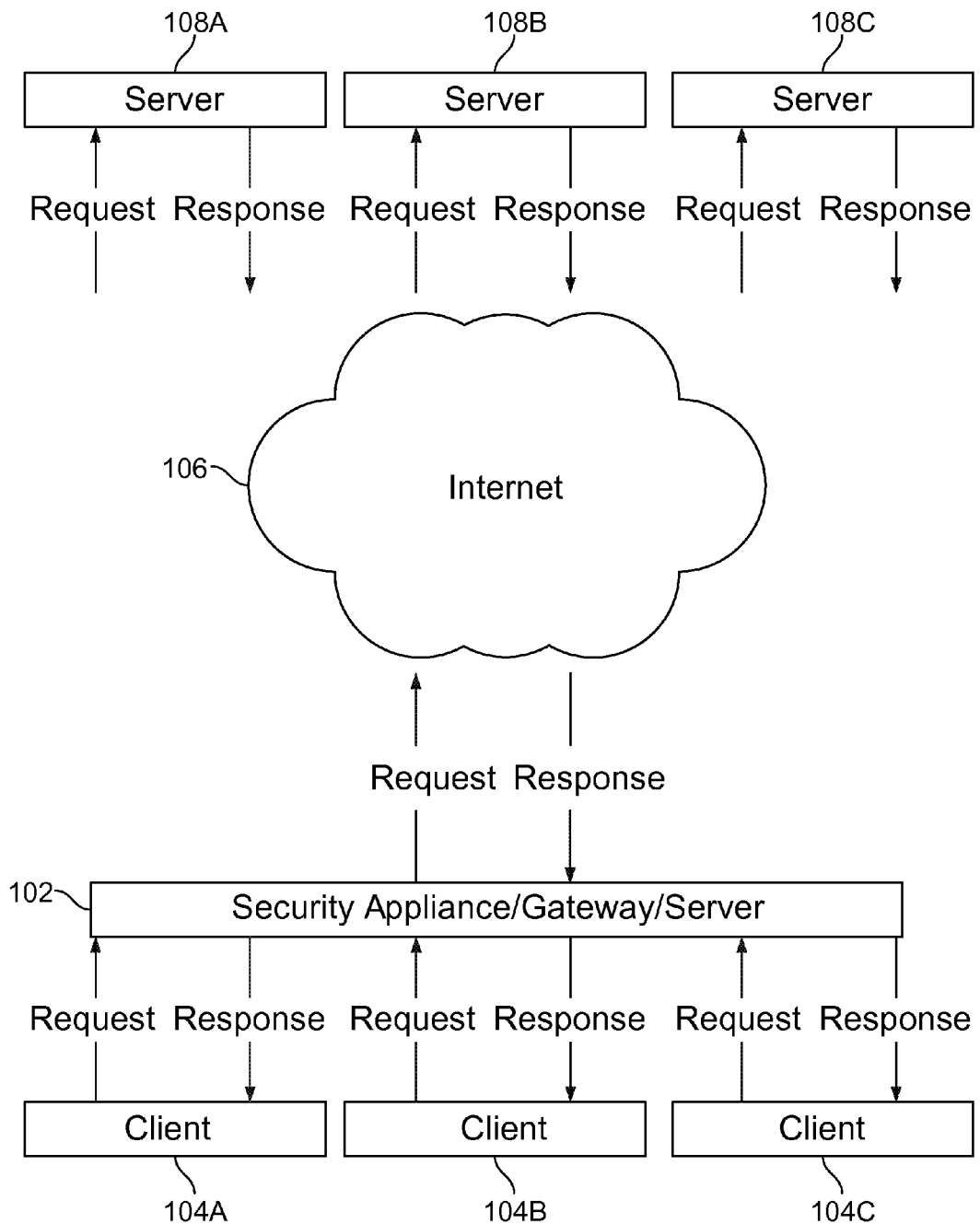
FIG. 1 is a functional diagram illustrating a security device for identification of malware sites using unknown URL sites and newly registered DNS addresses in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A botnet generally refers to a collection of compromised hosts, called bots. These bots are controlled by a bot master through a command and control (C&C) channel. Botnets can generally be classified as IRC-based, HTTP-based, and P2P-based botnets, according to the underlying C&C communication protocol.

The term botnet is often used to refer to any group of bots, such as IRC bots (e.g., bots communicating using IRC protocols), HTTP bots (e.g., bots communicating using HTTP protocols), and peer-to-peer (P2P) bots (e.g., bots communicating using peer-to-peer protocols). The term botnet is also generally used to refer to a collection of compromised computers/devices (e.g., often referred to as zombie computers/devices, such as computers executing software). Botnets are usually installed via drive-by downloads exploiting web browser vulnerabilities, worms, Trojan horses, and/or backdoors, under a common command-and-control (C&C) infrastructure.

Botnets are often created for financial gain and/or malicious or target attacks to disrupt and/or to compromise a remote target (e.g., computer systems and/or computer stored information of the remote target). For example, the larger the number of devices (e.g., machines, such as various types of computing devices) that are controlled by the botnet, the more computing resources that the botnet controller can use for their intended purpose(s). According to some estimates, up to one quarter of all personal computers connected to the Internet may be part of a botnet. In some cases, the botnet controller can rent the services of the botnet to third parties, such as for sending out spam messages (e.g., a spambot) and/or spamdexing, for performing a denial-of-service (DoS) attack against a remote target, adware, click fraud, and/or spyware for stealing various information (e.g., application serial numbers, login IDs, and/or financial information, such as credit card numbers and/or other identity or confidential information, including possibly confidential corporate information, as in the case of the Aurora botnet).

If the botnet includes a large number of compromised devices, then significant volumes of traffic (e.g., email or DoS traffic) can be generated using all or a subset of the botnet controlled devices (e.g., compromised hosts). In order to attempt to evade detection (e.g., antispam detection techniques and DoS detection techniques), the volumes of such traffic originating from a single compromised host are made lower for each compromised host and distributed across a greater number of compromised hosts.

Botnets are becoming a significant part of the Internet, which are very difficult to detect due to increasing and evolving techniques used by botnet controllers to avoid detection.

As conventional IRC networks now often use measures to block access to previously hosted botnets, botnet controllers are increasingly using their own servers for controlling the botnets. A botnet will also often include a variety of connections and network types, which adds to the complexity of identifying botnet controllers.

A creator of a botnet (e.g., sometime referred to as a bot master or bot herder) can control the group remotely, usually through a communication channel/protocol, such as Internet Relay Chat (IRC), and usually for malicious and/or unauthorized purposes. For example, IRC bots can be implemented as individual programs (e.g., software agents), and the command-and-control takes place via an IRC server or a specific channel on a public IRC network. This server is often referred to as the command-and-control server (C&C server).

For example, a botnet sends out malware (e.g., a virus(es) or worm(s)) that infect users' computers, in which the malware includes a payload that includes a bot, which is itself a malicious application (e.g., executable code, such as software agents). The bot is executed on the infected users' computers and logs into and communicates with a C&C server (e.g., an IRC server and/or a web server). In some cases, a spammer can purchase the services of the botnet from the botnet operator. The spammer provides the spam messages to the operator, who instructs the compromised machines via the IRC server, causing them to send out spam messages and/or perform other spam related functions.

In some cases, more sophisticated botnet operators are increasingly creating (e.g., programming) their own command-and-control protocols rather than using existing and/or standard protocols, such as customized versions of existing protocols, such as a modified/extended SMTP protocol version, and/or newly created custom protocols. In some cases, fingerprints or protocol signatures can be created to detect such custom command-and-control protocols once such are identified in the wild. Such newly created command-and-control protocols typically include a server program, a client program for operation, and the program that embeds itself on the target's machine (e.g., the bot), which usually communicate with each other over a network using an encryption scheme (e.g., a unique encryption scheme) for stealth and protection against detection or intrusion into the botnet network.

A bot typically executes in a stealth mode to avoid detection and uses a covert channel (e.g., the RFC 1459 (IRC) standard, Twitter®, IM, and/or a newly created protocol) to communicate with its C&C server. Generally, the creator/entity responsible/behind the botnet controller has compromised a series of computers/devices using various tools (e.g., exploits, buffer overflows, as well as other techniques). In a more recent trend, bots can automatically scan their computing/device environment and propagate themselves to other computers/devices using vulnerabilities and weak passwords. The more vulnerabilities a bot can scan, the more valuable it generally becomes to a botnet controller. This process of misappropriating or stealing computing resources as a result of a system being joined to the botnet is often referred to as scrumping.

Botnet servers will also often communicate with other botnet servers. For example, a botnet server group can include several to dozens or more of compromised and/or botnet controller server owned controller devices (e.g., high-speed connected machines, such as computer servers, which may be networked/architected for redundancy and/or fail over). For example, botnet communities usually include one or several controllers that typically do not have highly developed command hierarchies between themselves; rather, they often just rely on individual peer-to-peer/friend-to-friend relationships.

The architecture of botnets is continuing to evolve. For example, botnets use various different topologies (e.g., star, multi-server, hierarchical, and random) for command and control for stealth and resiliency purposes, such as to further complicate command and control location discovery. Another recent trend to avoid detection is for botnets to be smaller in size.

Various host-based botnet detection techniques typically use fingerprint or signature-based techniques to attempt to identify bot behavior that has, for example, bypassed conventional antimalware software (e.g., antivirus software). However, these techniques are only effective if there exists an effective signature for a given botnet. Certain botnets are not yet determined in the wild and, thus, there are no effective signatures available and/or some botnets do not yield themselves for easy signature-based detection techniques. Also, signature-based detection techniques are prone to false positive problems. For example, non-malicious web-based network activity may be improperly identified as being associated with a botnet.

Network-based approaches tend to attempt to identify and completely shut down C&C servers and/or IRC servers. However, as discussed herein, such C&C servers often are difficult to identify and utilize various redundancy techniques that make shutting down C&C servers very difficult. Completely blocking IRC protocols can also be undesirable for, as an example, corporate networks that want to allow users authorized, non-malicious/non-botnet-based use of such IRC protocol activity.

Newer botnets are generally implemented using peer-to-peer (P2P) network communications, with command-and-control embedded into the botnet itself. In some cases, the bot software on the host is dynamically updateable and variable such that the bot can evade having any single point of detection or failure. In some cases, commanders can be identified through secure keys, and all data except the binary itself can be encrypted. For example, a spyware program can use a public/private key encryption technique, in which all suspected passwords are encrypted with a public key hard coded or distributed into the bot software. As a result, the bot can only be read with the private key, which only the commander has. Also, newer botnets have even been capable of detecting and reacting to attempts to figure out how they work. A large botnet that can detect that it is being studied can even execute a distributed denial of service attack (DDoS) directed at those investigating the botnet (e.g., some research labs and companies attempt to emulate botnet behavior in a controlled network environment, such as using several to hundreds of thousands or even millions of Linux kernels and/or virtual machines).

In particular, identifying botnet controllers is difficult for several reasons, such as those discussed above and for various additional reasons, such as those described below. For example, botnets typically attempt to conceal themselves by using different code implementations (e.g., obfuscations, versions, as well as other techniques) on each device (e.g., each client computer, server computer, mobile computing device, and/or other computing device). As a result, signature detection alone is an insufficient technique for botnet detection. As another example, botnet controllers often use new and different C&C servers to avoid detection based on previously identified C&C servers.

What are needed are new techniques for botnet detection. In some embodiments, identification of malware sites using unknown URL sites and newly registered DNS addresses is provided. For example, unknown URL sites can include unknown URLs, unknown network sites, unknown site or unknown domain refers to a URL, domain or network site or site not yet analyzed by the processor identifying malware and as such, considered unknown.

In some embodiments, identification of malware sites using unknown URL sites and newly registered DNS addresses includes performing a heuristic analysis for information associated with a network site (e.g., a network domain and/or uniform resource locator (URL) of a web domain); and generating a score based on the heuristic analysis, in which the score can be assigned to the network site and indicates whether the network site is a potentially malicious site (e.g., associated with a suspected botnet). In some embodiments, the system includes a security appliance, security gateway, or security server (e.g., or other security device) that is in communication with the Internet. In some embodiments, the network site is associated with a network domain and/or a network uniform resource locator (URL).

In some embodiments, performing a heuristic analysis for information associated with a network site includes determining if a network site has recently been registered (e.g., newly registered domains, such as if foobar.com has been registered within the last 6-9 months, are generally more suspicious/likely to potentially be a botnet controller). In some embodiments, performing a heuristic analysis for information associated with a network site includes determining if a network site is associated with recently changed DNS information (e.g., IP address associated with the foobar.com domain is present and then not present or changes; or changes to a new IP address(es) that is outside of the same subnet of its previous IP address). In some embodiments, performing a heuristic analysis for information associated with a network site includes determining source information and/or geographical information associated with the network site and IP network related source information.

In some embodiments, identification of malware sites using unknown URL sites and newly registered DNS addresses includes determining if a network site has recently been registered (e.g., new DNS registration); and assigning a score based on the length of time since the registration of that new domain, in which the score indicates whether the network site is potentially malicious.

In some embodiments, identification of malware sites using unknown URL sites and newly registered DNS addresses includes determining a list of network sites that have recently been registered; and generating a list of potentially malicious network sites based on the list of network sites that have recently been registered (e.g., which can be stored locally, such as on a security device, or remotely, such as on a cloud service). In some embodiments, identification of malware sites using unknown URL sites and newly registered DNS addresses includes determining if a network site is associated with recently changed DNS information; and assigning a score based on the length of time since the associated DNS information has changed, in which the score indicates whether the network site is potentially malicious. In some embodiments, identification of malware sites using unknown URL sites and newly registered DNS addresses includes generating a list of DNS changes for a plurality of network sites; and storing the list of DNS changes. In some embodiments, identification of malware sites using unknown URL sites and newly registered DNS addresses includes determining that a network site is a potentially malicious site based on a threshold.

In some embodiments, identification of malware sites using unknown URL sites and newly registered DNS addresses includes determining that a network site is a potentially malicious site; and publishing information associated with the network site for blocking access to/from the network site and/or monitoring access to/from the network site (e.g., to a firewall or another security software/hardware element, such as for implementing various firewall policy actions, such as block and/or packet capture for monitoring of the network site). In some embodiments, identification of malware sites using unknown URL sites and newly registered DNS addresses includes determining that a network site is a potentially malicious site; and blocking access to/from the network site. In some embodiments, identification of malware sites using unknown URL sites and newly registered DNS addresses includes determining that a network site is a potentially suspicious site; and monitoring access to/from the network site to determine whether the network site is a malware site.

In some embodiments, identification of malware sites using unknown URL sites and newly registered DNS addresses includes determining that a network site is a potential malware site based on URL sites and newly registered DNS addresses. In some embodiments, identification of malware sites using unknown URL sites and newly registered DNS addresses includes determining that a network site is a potential malware site based on DNS activity.

In some embodiments, identification of malware sites using unknown URL sites and newly registered DNS addresses includes determining that a network site is a potential malware site based on DNS presence information, in which the DNS presence information indicates that the network site with an IP address is periodically unavailable. In some embodiments, identification of malware sites using unknown URL sites and newly registered DNS addresses includes determining that a network site is a potential malware site based on IP address changes.

In some embodiments, identification of malware sites using unknown URL sites and newly registered DNS addresses includes applying a security policy based on a determination that a network site is a potential malware site; and reporting that the network site is a potential malware site.

In some embodiments, identification of malware sites using unknown URL sites and newly registered DNS addresses includes requesting zone file access to determine recently changed domain names and associated IP addresses for a plurality of network sites.

In some embodiments, identification of malware sites using unknown URL sites and newly registered DNS addresses includes determining that a network site is a potential malware site; and verifying that the network site is a malware site if a virus sample attempts to connect to the suspicious network site.

In some embodiments, identification of malware sites using unknown URL sites and newly registered DNS addresses includes determining that a network site is a potential malware site; inspecting the network site to determine content available on the network site; and verifying that the network site is a malware site if the network site does not include or has a limited amount of any of the following: plain text, script, and/or HTML content, and URLs suitable for human navigation of the site. In some embodiments, networks sites can be examined using a web crawler, and the content available on the site is given a score to measure its human readability. The analysis of the network site's content includes, for example, the use of natural language processing to measure the human readability of the site, analysis of links between pages in the same network site to measure navigability of the sites (e.g., identification of orphan pages, which are pages not linked to by any other pages), and analysis of links to and from other networks sites with the purpose of identifying links from/to suspicious networks sites.

In some embodiments, identification of malware sites using unknown URL sites and newly registered DNS addresses includes receiving an outbound request to access a network site (e.g., foobar.com); and communicating the network site to a security cloud service to request whether the network site (e.g., foobar.com) is a potentially malicious site or malware site.

In some embodiments, identification of malware sites using unknown URL sites and newly registered DNS addresses includes communicating one or more botnet reports to a security cloud service, in which the security cloud service aggregates the one or more botnet reports to correlate potentially suspicious botnet behavior to determine whether one or more network sites are potentially malicious sites and/or malware sites (e.g., a spike in traffic to the network site, in which the network site is a newly registered domain and/or other patterns or behaviors or combinations thereof, such as those described herein).

In some embodiments, a cloud security service aggregates and correlates botnet reports received from multiple security gateways, security appliances, and/or other security software/hardware elements (e.g., from a single enterprise customer and/or across multiple enterprise customers, and/or also using shared reports across multiple security vendors) in order to determine potentially malicious sites and/or malware sites. In some embodiments, the cloud security service periodically updates potentially malicious and/or malware site information that can be distributed via various security subscriptions or upon request, as described herein with respect to various embodiments.

In some embodiments, identification of malware sites using unknown URL sites and newly registered DNS addresses includes removing the network site from a white list, if the network site is determined to be a potentially malicious or malware site.

In some embodiments, identification of malware sites using unknown URL sites and newly registered DNS addresses includes determining that a network site is a potential malware site if the network site has been churned (e.g., recently changed domain name/URL ownership and/or recently changed IP addresses).

In some embodiments, identification of malware sites using unknown URL sites and newly registered DNS addresses includes determining that a network site is a potential malware site; and adding the network site to a black list or potentially malicious list for further security scrutiny (e.g., packet capture for further activity/behavior monitoring).

In some embodiments, identification of malware sites using unknown URL sites and newly registered DNS addresses includes a data store for storing a list of potentially malicious sites and/or malware sites (e.g., a black list of network sites). In some embodiments, identification of malware sites using unknown URL sites and newly registered DNS addresses further includes a data store for storing a list of known good and/or trusted sites (e.g., a white list of network sites). In some embodiments, identification of malware sites using unknown URL sites and newly registered DNS addresses includes communicating the black list of network sites and/or the white list of network sites to one or more clients. For example, a push update of a black list can be generated periodically and/or based on event triggers (e.g., every 30 minutes, in which, for example, a new network site, such as foobar.com, can be indicated as determined to be suspicious or known bad, or upon determination that foobar.com is a potentially malicious site or malware site).

In some embodiments, identification of malware sites using unknown URL sites and newly registered DNS addresses includes a data store for storing a list of potentially malicious sites and/or malware sites, in which for each potentially malicious network site the following information is stored: domain and/or IP address, a malware evaluation score (e.g., 75% likely malware or risky, highly risky, or a raw score based on various evaluation metrics, such as based on the various evaluation criteria described herein), and/or a type of malware (e.g., which botnet, if determined or suspected).

In some embodiments, identification of malware sites using unknown URL sites and newly registered DNS addresses includes, based on a score for a network site, performing further security monitoring of requests to the network site. For example, for each network site that is determined to have a newly registered domain, the network site can be classified or scored as potentially suspicious for further monitoring, and if suspicious traffic patterns evolve in a subsequent period of time (e.g., days or weeks or months), then the network site can be classified or scored as highly suspicious or as malware (e.g., block or packet capture for monitoring). As an example, the fluxnet bot is associated with certain known behavior(s), such as it changes the IP address outside of the same subnet every few seconds. As another example, sample virus/botnet code on a test client can call out to that botnet when in observation.

In some embodiments, a heuristic to identify a list of potentially malicious network sites includes determining a list of recently registered domains; determining DNS information associated with each of the recently registered domains; determining DNS information changes for each of the recently registered domains; and determining source information and geographical information for each of the recently registered domains. Examples of information retrieved from DNS registration using DNS lookup utilities include the following: IP addresses associated with the domain, mail exchanges associated with the entry, authoritative name servers for the domain, and other domains using the same IP addresses identified by using reverse DNS lookups. From the IP address(es), and using data from the regional registries (e.g., ARIN, RIPE, AFRINIC, APNIC, and/or LACNIC) and data from internet routing tables (e.g., BGP table), the following is example information that can be associated with the network domain under analysis: Autonomous System Number (ASN), country location, regional registry, IP address(es) being part of a unallocated IP space (Bogon), and router(s) advertising entries for the IP address(es) associated with the network domain.

FIG. 1 is a functional diagram illustrating a security device for identification of malware sites using unknown URL sites and newly registered DNS addresses in accordance with some embodiments. As shown, client devices 104A, 104B, and 104C are in communication with the Internet 106 via a security device 102. In some embodiments, the security device 102 includes a security appliance, a security gateway, a security server, and/or some other security device, which, for example, can be implemented using computing hardware, software, or various combinations thereof. For example, client devices 104A-C can include various computing devices that can access the Internet via wired and/or wireless communications, such as computers, laptops, tablets, smart phones, and/or various other types of computing devices with network communication capabilities. As also shown, servers 108A, 108B, and 108C are in communication with the Internet. For example, a client device can access a service provided by a server via the Internet, such as a web related service (e.g., web site, cloud-based services, streaming services, or email service), peer-to-peer related service (e.g., file sharing), IRC service (e.g., chat service), and/or any other service that can be delivered via the Internet.

In some embodiments, the security device 102 implements various network security functions for identification of malware sites using unknown URL sites and newly registered DNS addresses as described herein with respect to various embodiments. In some embodiments, the various network security functions for identification of malware sites using unknown URL sites and newly registered DNS addresses as described herein with respect to various embodiments are implemented in part in security device 102 and in part in each of the client devices. In some embodiments, the various network security functions for identification of malware sites using unknown URL sites and newly registered DNS addresses as described herein with respect to various embodiments are implemented in part in security device 102 and in part using a cloud-based security service accessible via the Internet (e.g., using secure communications), as described further herein with respect to various embodiments. In some embodiments, the various network security functions for identification of malware sites using unknown URL sites and newly registered DNS addresses as described herein with respect to various embodiments are implemented in part in security device 102, in part using a cloud-based security service accessible via the Internet (e.g., using secure communications), and in part in each of the client devices. In some embodiments, the various network security functions for identification of malware sites using unknown URL sites and newly registered DNS addresses as described herein with respect to various embodiments are implemented in each of the client devices (e.g., implemented as security software executed on each client device and/or in client device hardware, such as a general processor and/or modem processor). In some embodiments, the various network security functions for identification of malware sites using unknown URL sites and newly registered DNS addresses as described herein with respect to various embodiments are implemented in part in each of the client devices and in part using a cloud-based security service accessible via the Internet (e.g., using secure communications).

Figure 2:
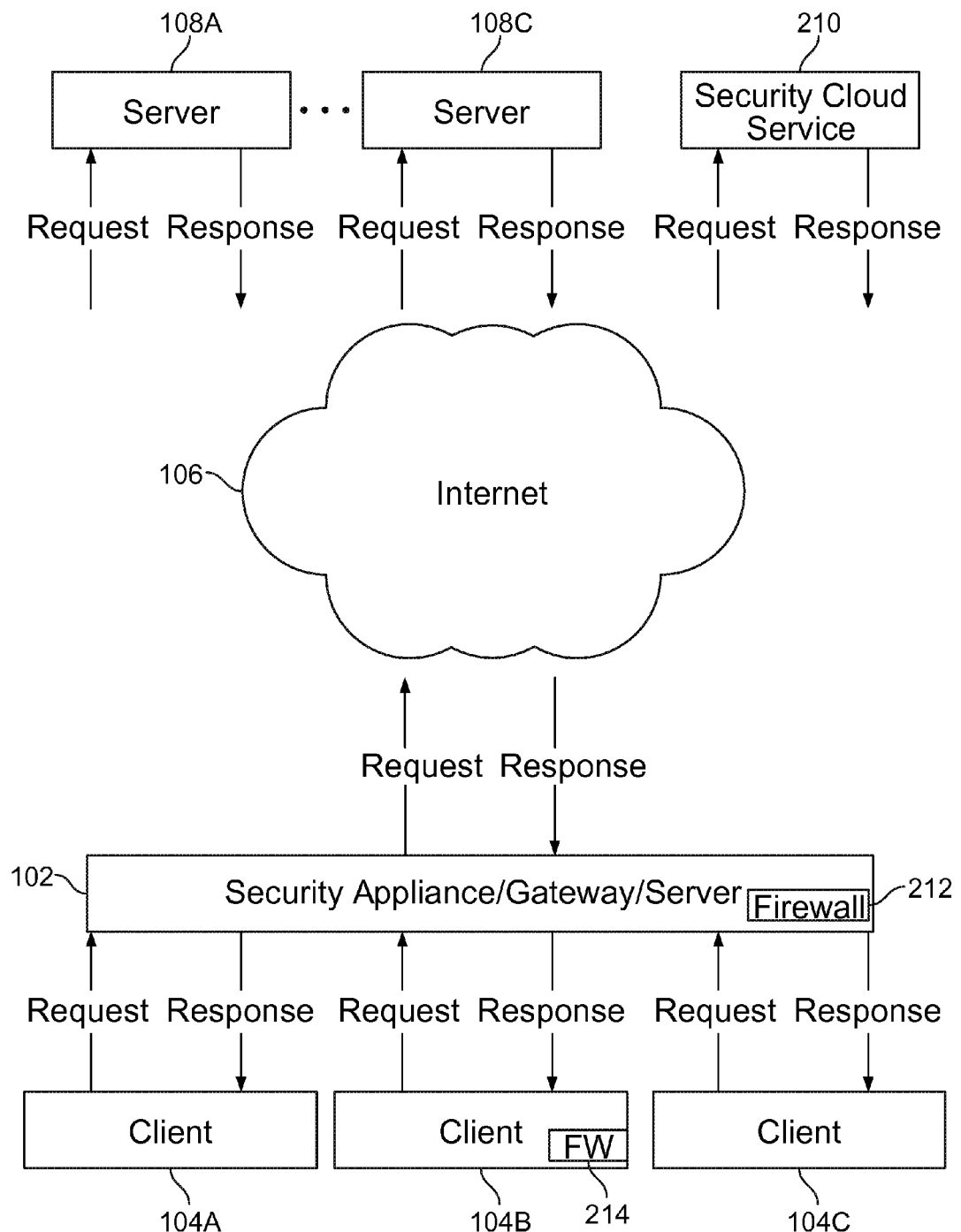
FIG. 2 is another functional diagram illustrating a security device for identification of malware sites using unknown URL sites and newly registered DNS addresses in accordance with some embodiments.

FIG. 2 is another functional diagram illustrating a security device for identification of malware sites using unknown URL sites and newly registered DNS addresses in accordance with some embodiments. In some embodiments, the security device (e.g., an integrated security appliance/gateway/server) communicates with a security cloud service 210 (e.g., using secure communications, such as encrypted communication techniques).

For example, the security device can communicate a client's outbound request to access a network site (e.g., foobar.com) to the security cloud service to request whether the network site (e.g., foobar.com) is a potentially malicious site or malware site. As another example, botnet reports can be communicated to the security cloud service, and the security cloud service can aggregate the botnet reports to correlate potentially suspicious botnet behavior to determine whether one or more network sites are potentially malicious sites and/or malware sites (e.g., a spike in traffic to a particular network site, in which the network site is a newly registered domain and/or other patterns or behaviors or combinations thereof, such as those described herein). As yet another example, the cloud security service can aggregate and correlate botnet reports received from multiple security gateways, security appliances, and/or other security software/hardware elements in order to determine potentially malicious sites and/or malware sites. The cloud security service can also periodically update potentially malicious and/or malware site information that can be distributed via various security subscriptions or upon request or based on events or configured updating requirements.

In some embodiments, the security appliance/gateway/server also includes a firewall function. In some embodiments, one or more of the client devices includes a managed firewall. In some embodiments, a list of potentially malicious and/or malware network sites is published to such firewalls or another security software/hardware element, such as for implementing various firewall policy actions, such as—block- and/or packet capture for monitoring- or for blocking access to/from the network site.

As shown in FIG. 2, security device 102 includes a firewall 212. In some embodiments, a client device can also include a firewall (e.g., a managed client firewall). As also shown in FIG. 2, client 104B includes firewall 214. For example, identification of malware sites using unknown URL sites and newly registered DNS addresses can include determining that a network site is a potentially malicious site or a malware site; and publishing information corresponding to that network site for blocking access to/from the network site and/or monitoring access to/from the network site (e.g., to a firewall, such as firewall(s) 212 and/or 214, or another security software/hardware element, such as for implementing various firewall policy actions, such as block and/or packet capture for monitoring access to/from the network site). As another example, identification of malware sites using unknown URL sites and newly registered DNS addresses can include determining that a network site is a potentially malicious site or malware site; and blocking access to/from the network site using firewall(s) 212 and/or 214. As yet another, identification of malware sites using unknown URL sites and newly registered DNS addresses can include determining that a network site is a suspicious site or potentially malicious site; and monitoring access to/from the network site using firewall(s) 212 and/or 214 to determine whether the network site is a malware site.

Figure 3:
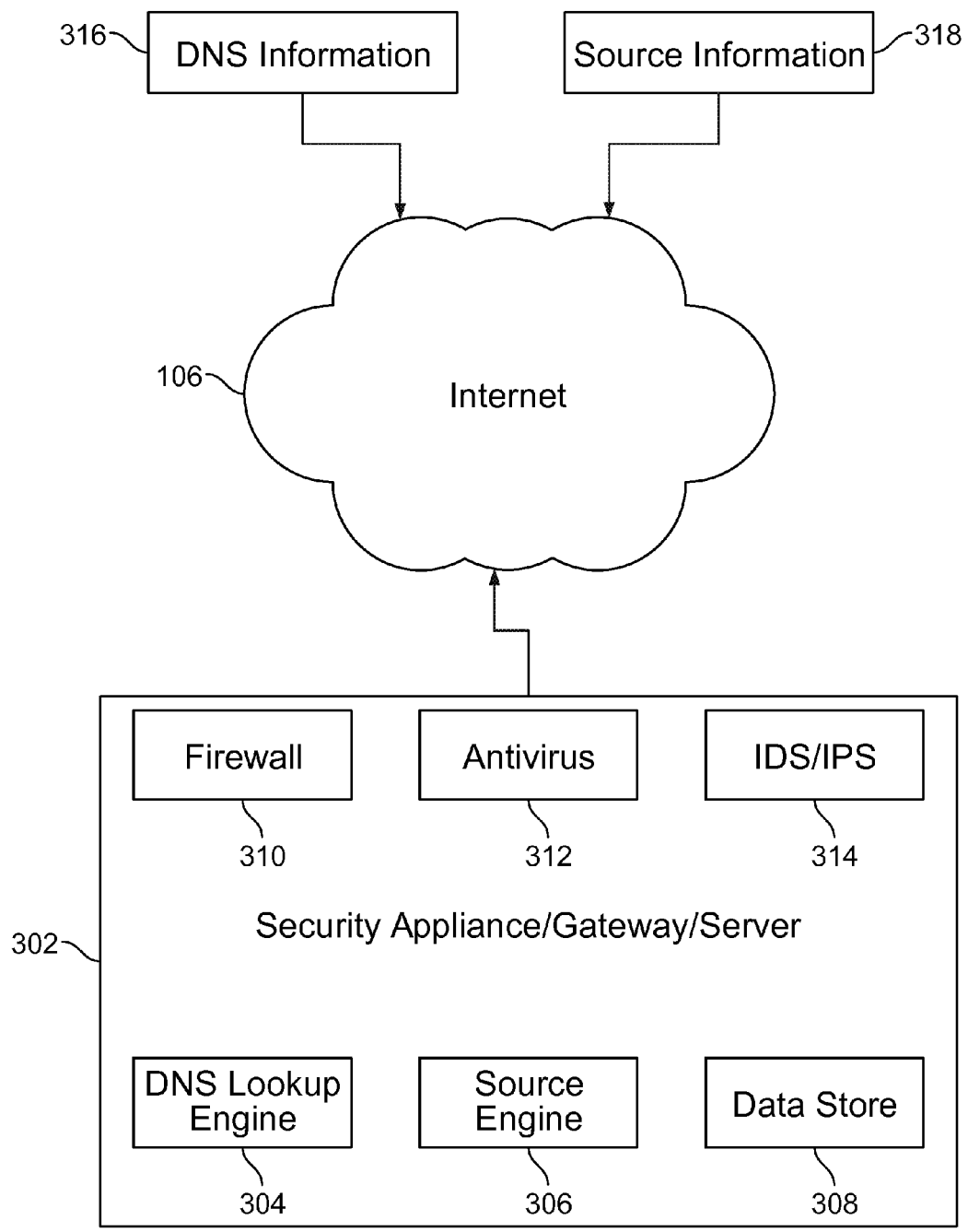
FIG. 3 is another functional diagram illustrating a security device for identification of malware sites using unknown URL sites and newly registered DNS addresses in accordance with some embodiments.

FIG. 3 is another functional diagram illustrating a security device for identification of malware sites using unknown URL sites and newly registered DNS addresses in accordance with some embodiments. As shown, a security device 302 (e.g., security appliance/gateway/server) includes a DNS lookup engine 304 that communicates with a DNS information 316. For example, the DNS lookup engine 304 can request and process DNS information for network sites from the DNS information 316 (e.g., using DNS lookup utilities, the following information can be determined: IP addresses associated with the domain, mail exchanges associated with the entry, authoritative name servers for the domain, and other domains using the same IP addresses by using reverse DNS lookups). As another example, identification of malware sites using unknown URL sites and newly registered DNS addresses can include processing zone files for changes in domain registration information (e.g., DNS information changes, such as DNS related churn). As also shown, a security device 302 includes a data store 308. In some embodiments, the data store 308 stores various security related information, such as DNS related information processed by and/or provided by the DNS lookup engine 304.

As also shown in FIG. 3, the security device 302 includes a source engine 306 that communicates with source information 318. For example, the source engine 306 can request and process source information for network sites from the source information 318 (e.g., a system to aggregate, normalize, and collate information from a regional Internet registry (RIR) and Internet routing information such as the BGP table). As another example, identification of malware sites using unknown URL sites and newly registered DNS addresses can include implementing a source engine to identify the source associated with a network site (e.g., country, ASN, and/or network domain provider). In some embodiments, the data store 308 stores various security related information, such as source related information processed by and/or provided by the source engine 306.

As also shown in FIG. 3, the security device 302 includes various other security functionality, including firewall 310, antivirus 312, and IDS/IPS (intrusion detection system/intrusion prevention system) 314. In some embodiments, these other security functions can be implemented in part or completely on other security devices in communication with the security device 302 and/or implemented in part or completely on the client devices. In some embodiments, the security device 302 can use the identification of malware sites using unknown URL sites and newly registered DNS addresses to program based on various techniques described herein, and in some embodiments in combination with various other techniques for identifying potentially malicious and/or malware sites, and/or publish such information to these other security functions to implement various security functions based on that identification of potentially suspicious and/or malware sites, such as to block access to such sites and/or monitor access to such sites.

Figure 4:
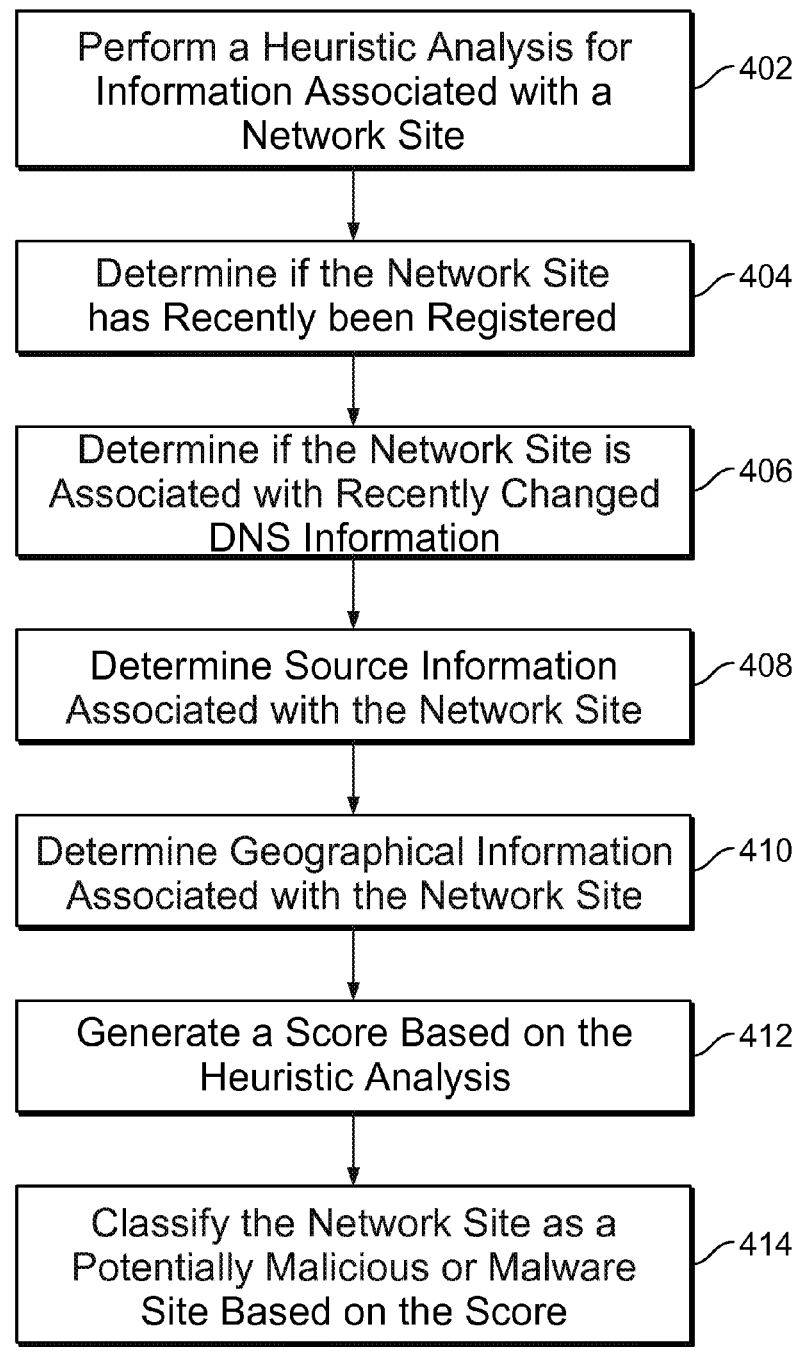
FIG. 4 is a flow diagram for identification of malware sites using unknown URL sites and newly registered DNS addresses in accordance with some embodiments.

FIG. 4 is a flow diagram for identification of malware sites using unknown URL sites and newly registered DNS addresses in accordance with some embodiments. At 402, a heuristic analysis for information associated with a network site is performed (e.g., a network domain and/or uniform resource locator (URL) of a web domain). At 404, determining if the network site has recently been registered is performed (e.g., newly registered domains, such as if foobar.com has been registered within the last 6-9 months, are generally more suspicious/likely to potentially be a botnet controller). At 406, determining if a network site is associated with recently changed DNS information is performed (e.g., IP address associated with the foobar.com domain is present and then not present or changes; or a new IP address(es) outside of the same subnet). At 408, determining source information associated with the network site is performed (e.g., IP network related source information, such as associated ASN, IPs of the system's advertising routing for the IP associated with the network site, IP of systems routing traffic from the network site collected using traceroute or My Trace Route (MTR) or a similar mechanism to identify the location of the network site as it relates to other nodes of the Internet). At 410, determining geographical information associated with the network site is performed. At 412, generating a score based on the heuristic analysis is performed (e.g., and assigned to the network site). At 414, classifying the network site as a potentially malicious or malware site (e.g., a botnet site) based on the score is performed.

Figure 5:
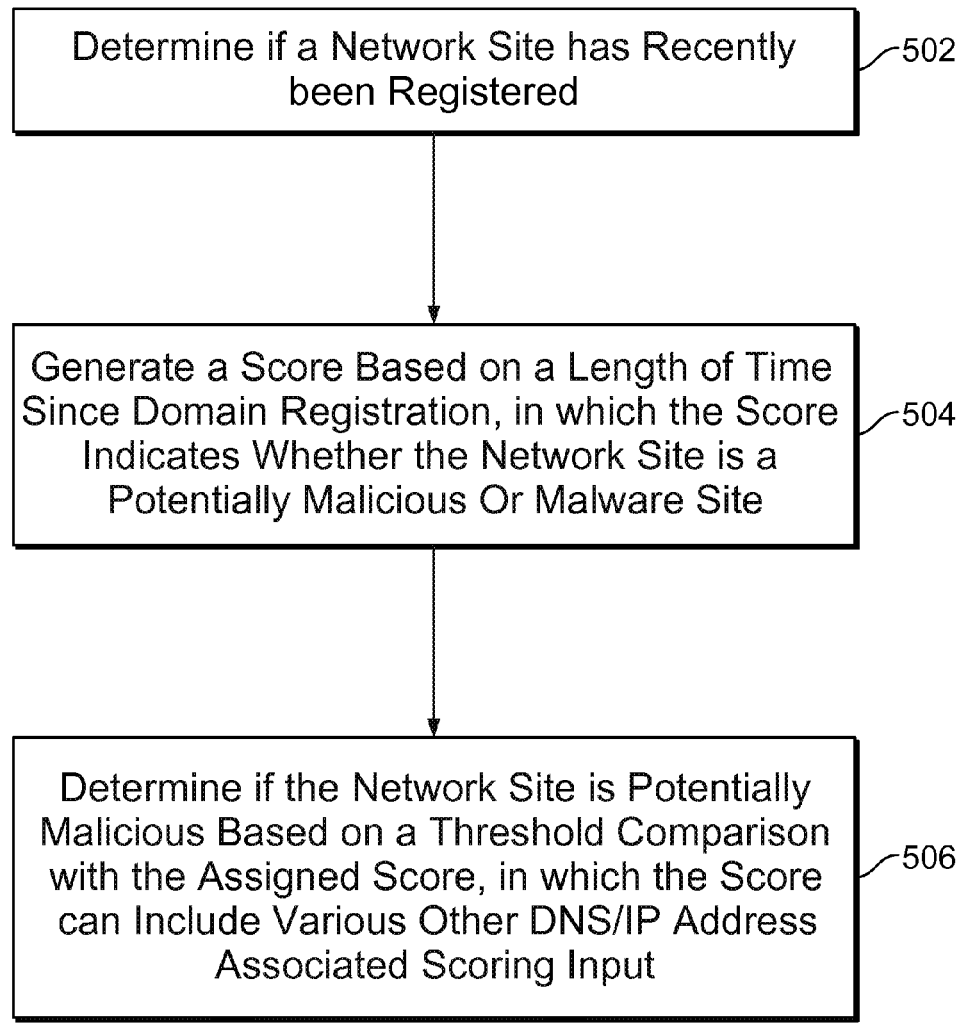
FIG. 5 is another flow diagram for identification of malware sites using unknown URL sites and newly registered DNS addresses in accordance with some embodiments.

FIG. 5 is another flow diagram for identification of malware sites using unknown URL sites and newly registered DNS addresses in accordance with some embodiments. At 502, determining if a network site has recently been registered (e.g., new DNS registration) is performed. At 504, generating a score based on a length of time since the domain was registered is performed. At 506, determining if the network site is potentially malicious based on a threshold comparison with the assigned score is performed (e.g., the score can include various other DNS/IP addresses, source, geographical, and/or other information that can be associated with heuristic or other techniques for identifying potentially malicious/malware network sites). In some embodiments, the score indicates whether the network site is a potentially malicious site or malware site, such as a botnet site (e.g., the network site can be classified as not suspicious, potentially suspicious, or malware). In some embodiments, identification of malware sites using unknown URL sites and newly registered DNS addresses includes adding a network site that is determined to be a malware site or a potentially malicious site to a black list or potentially malicious list for further security scrutiny (e.g., packet capture for further activity/behavior monitoring).

Figure 6:
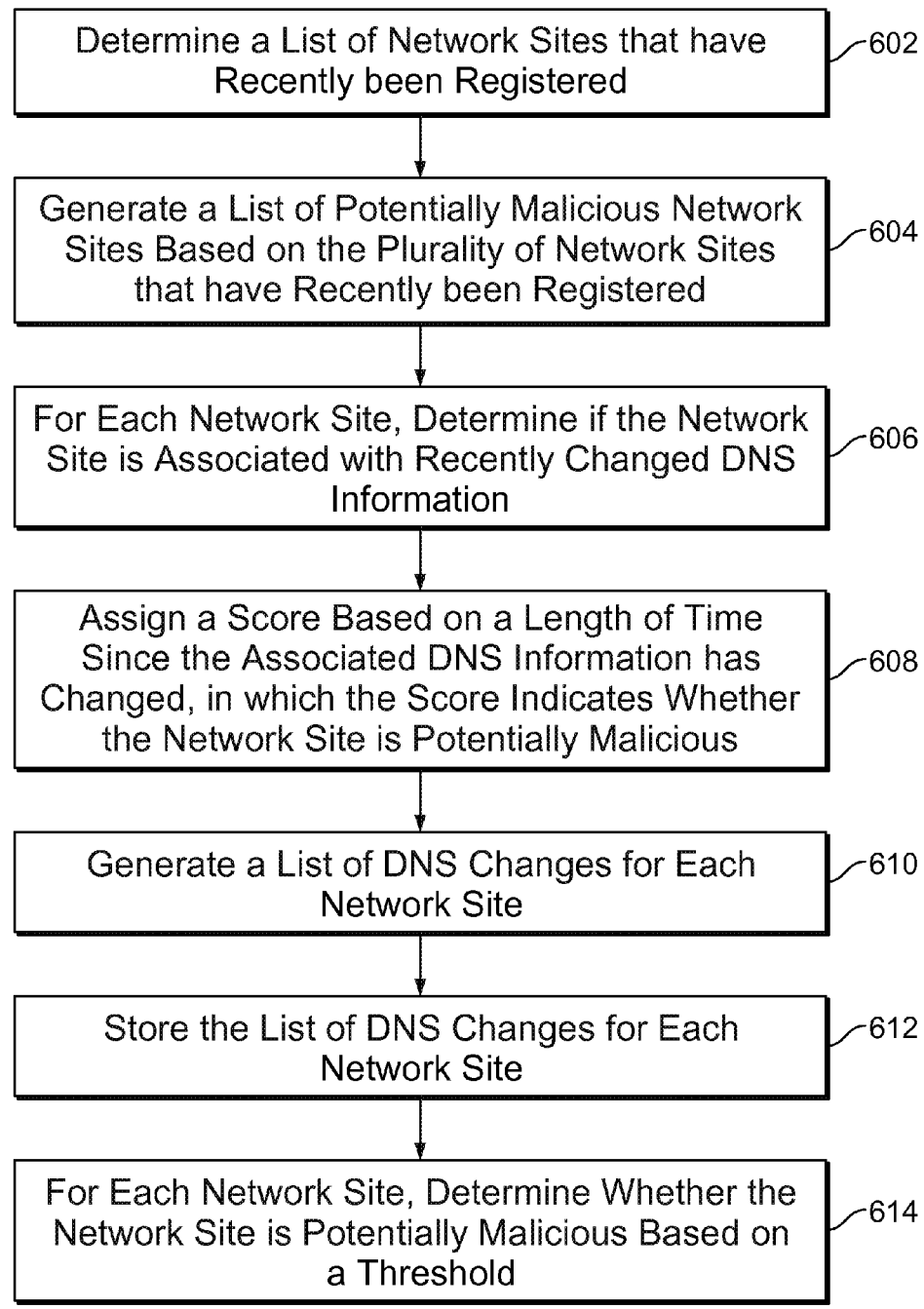
FIG. 6 is another flow diagram for identification of malware sites using unknown URL sites and newly registered DNS addresses in accordance with some embodiments.

FIG. 6 is another flow diagram for identification of malware sites using unknown URL sites and newly registered DNS addresses in accordance with some embodiments. At 602, determining a list of network sites that have recently been registered is performed (e.g., which can be stored locally or remotely, such as on security device and/or in a security cloud service, such as described herein with respect to various embodiments). At 604, generating a list of potentially malicious network sites based on the list of network sites that have recently been registered is performed (e.g., which can be stored locally or remotely, such as on security device and/or in a security cloud service, such as described herein with respect to various embodiments). At 606, for each network site, determining if the network site is associated recently changed DNS information is performed. At 608, assigning a score based on a length of time since the associated DNS information has changed is performed, in which the score indicates whether the network site is potentially malicious. At 610, generating a list of DNS changes for each network site is performed. At 612, storing the list of DNS changes for each network site is performed (e.g., which can be stored locally or remotely, such as on security device and/or in a security cloud service, such as described herein with respect to various embodiments). At 614, for each network site, determining whether the network site is a potentially malicious site (e.g., potentially a botnet site) based on a threshold (e.g., threshold comparison) is performed.

As would be apparent to one of ordinary skill in the art in view of the various embodiments described herein, the various techniques described herein for identification of malware sites using unknown URL sites and newly registered DNS addresses can be implemented in various ways in various types of computer, security, network software and/or hardware and/or in various combinations thereof.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
 a processor configured to:
  perform a heuristic analysis for information associated with a network site, wherein performing a heuristic analysis for information associated with a network site further comprises:
   determine whether the network site has a change in DNS information, the change in DNS information including a change in ownership of a network uniform resource locator (URL) and a new IP address outside of the same subnet;
   in the event that the DNS information of the network site has changed, determine when the change in the DNS information occurred;
   determine whether an IP address related to the network site is periodically unavailable based on DNS presence information; and determine source information associated with the network site, wherein the source information includes geographical information associated with the network site and IP network related source information, wherein the determining of the source information is based on a regional Internet registry (RIR) and a border gateway protocol (BGP) table; and assign a score based on the heuristic analysis, wherein the score indicates whether the network site is potentially malicious; and a memory coupled to the processor and configured to provide the processor with instructions.

2. The system recited in claim 1, wherein the system includes a security appliance that is in communication with the Internet, wherein the network site is associated with a network domain and/or the network uniform resource locator (URL).

3. The system recited in claim 1, wherein performing a heuristic analysis for information associated with a network site further comprises:

determine if the network site has recently been registered.

4. The system recited in claim 1, wherein the assign of the score comprises:

compare the score with a predefined threshold; and
in the event that the score exceeds the predefined threshold, determine that the network site is potentially malicious.

5. The system recited in claim 1, wherein the performing of the heuristic analysis for information associated with a network site further comprises:

analyzing human readability of the network site based on an analysis of links between pages of the same network site to measure navigability of the network site, an analysis of links to and from other network sites to identify links to and from suspicious network sites, an analysis of an amount of plain text, script, hypertext markup language (HTML) content, and/or uniform resource locator (URL) suitable for human navigation of the network site, or any combination thereof.

6. A method, comprising:

performing a heuristic analysis for information associated with a network site using a processor of a device in communication with a network, wherein performing a heuristic analysis for information associated with a network site further comprises:

determining whether the network site has a change in DNS information, the change in DNS information including a change in ownership of a network uniform resource locator (URL) and a new IP address outside of the same subnet;

in the event that the DNS information of the network site has changed, determining when the change in the DNS information occurred;

determining whether an IP address related to the network site is periodically unavailable based on DNS presence information; and determining source information associated with the network site, wherein the source information includes geographical information associated with the network site and IP network related source information, wherein the determining of the source information is based on a regional Internet registry (RIR) and a border gateway protocol (BGP) table; and assigning a score based on the heuristic analysis, wherein the score indicates whether the network site is potentially malicious.

7. The method of claim 6, wherein the device includes a security appliance that is in communication with the Internet, and wherein the network site is associated with a network domain and/or the network uniform resource locator (URL).

8. A system, comprising:

a processor configured to:

determine if a network site has recently been registered;

determine whether the network site has a change in DNS information, the change in DNS information including a change in ownership of a network uniform resource locator (URL) and a new IP address outside of the same subnet;

in the event that the DNS information of the network site has changed, determine when the change in the DNS information occurred;

determine whether an IP address related to the network site is periodically unavailable based on DNS presence information;

determine source information associated with the network site, wherein the source information includes geographical information associated with the network site and IP network related source information, wherein the determining of the source information is based on a regional Internet registry (RIR) and a border gateway protocol (BGP) table; and assign a score based on a length of time since a domain registration, whether the DNS information of the network site has changed, and the source information associated with the network site, wherein the score indicates whether the network site is potentially malicious; and a memory coupled to the processor and configured to provide the processor with instructions.

9. A system, comprising:

a processor configured to:

determine a plurality of network sites that have recently been registered;

determine whether a network site has a change in DNS information, the change in DNS information including a change in ownership of a network uniform resource locator (URL) and a new IP address outside of the same subnet;

in the event that the DNS information of the network site has changed, determine when the change in the DNS information occurred;

determine whether an IP address related to the network site is periodically unavailable based on DNS presence information;

determine source information associated with the network site, wherein the source information includes geographical information associated with the network site and IP network related source information, wherein the determining of the source information is based on a regional Internet registry (RIR) and a border gateway protocol (BGP) table; and generate a list of potentially malicious network sites based on the plurality of network sites that have recently been registered, whether the DNS information of the network site has changed, and the source information associated with the network site, and a memory coupled to the processor and configured to provide the processor with instructions.

10. The system recited in claim 9, wherein the memory is further configured to provide the processor with instructions which when executed cause the processor to:

generate a list of DNS changes for a plurality of network sites; and store the list of DNS changes.

11. The system recited in claim 9, wherein the memory is further configured to provide the processor with instructions which when executed cause the processor to:
  determine that a first network site is a potentially malicious site based on a threshold.

12. The system recited in claim 9, wherein the memory is further configured to provide the processor with instructions which when executed cause the processor to:
  determine that a first network site is a potentially malicious site; and
  publish the first network site to a firewall for blocking access to/from the first network site.

13. The system recited in claim 9, wherein the memory is further configured to provide the processor with instructions which when executed cause the processor to:
  determine that a first network site is a potentially malicious site; and
  block access to/from the first network site.

14. The system recited in claim 9, wherein the memory is further configured to provide the processor with instructions which when executed cause the processor to:
  determine that a first network site is a suspicious site; and
  monitor access to/from the first network site to determine whether the first network site is a potentially malicious site, wherein the network site is monitored to determine whether the network site is a botnet site.

15. The system recited in claim 9, wherein the memory is further configured to provide the processor with instructions which when executed cause the processor to:
  determine that a first network site is a potential malware site based on URL sites and newly registered DNS addresses.

16. The system recited in claim 9, wherein the memory is further configured to provide the processor with instructions which when executed cause the processor to:
  determine that a first network site is a potential malware site based on DNS activity.

17. The system recited in claim 9, wherein the memory is further configured to provide the processor with instructions which when executed cause the processor to:
  determine that a first network site is a potential malware site based on DNS presence information, wherein the DNS presence information indicates that the first network site with a first IP address is periodically unavailable.

18. The system recited in claim 9, wherein the memory is further configured to provide the processor with instructions which when executed cause the processor to:
  determine that a first network site is a potential malware site based on IP address changes.

19. The system recited in claim 9, wherein the memory is further configured to provide the processor with instructions which when executed cause the processor to:
  apply a security policy based on a determination that a first network site is a potential malware site; and
  report that the first network site is a potential malware site.

20. The system recited in claim 9, wherein the memory is further configured to provide the processor with instructions which when executed cause the processor to:
  request zone file access to determine recently changed domain names and associated IP addresses for a plurality of network sites.

21. The system recited in claim 9, wherein the memory is further configured to provide the processor with instructions which when executed cause the processor to:
  determine that a first network site is a potential malware site; and
  verify that the first network site is a malware site if a virus sample attempts to connect to the suspicious network site.

22. The system recited in claim 9, wherein the memory is further configured to provide the processor with instructions which when executed cause the processor to:
  determine that a first network site is a potential malware site;
  inspect the first network site to determine content available on the first network site; and
  verify that the first network site is a malware site if the first network site does not include or has a limited amount of any of the following: plain text, script, and/or HTML content, and URLs suitable for human navigation of the web site.

23. The system recited in claim 9, wherein the memory is further configured to provide the processor with instructions which when executed cause the processor to:
  receive an outbound request to access a first network site; and
  communicate the first network site to a security cloud service to request whether the first network site is a potentially malicious site or malware site.

24. The system recited in claim 9, wherein the memory is further configured to provide the processor with instructions which when executed cause the processor to:
  communicate one or more botnet reports to a security cloud service, wherein the security cloud service aggregates the one or more botnet reports to correlate potentially suspicious botnet behavior to determine whether one or more network sites are potentially malicious sites and/or malware sites.

* * * * *